United States Patent
Yang et al.

(10) Patent No.: US 12,502,788 B2
(45) Date of Patent: Dec. 23, 2025

(54) DEVICE FOR CORRECTING ROBOTIC ARM

(71) Applicant: CHANGXIN MEMORY TECHNOLOGIES, INC., Hefei (CN)

(72) Inventors: Jun Yang, Hefei (CN); Chunhu Ren, Hefei (CN); Le Tian, Hefei (CN); Liuguang Wang, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 1019 days.

(21) Appl. No.: 17/573,586

(22) Filed: Jan. 11, 2022

(65) Prior Publication Data

US 2022/0379488 A1    Dec. 1, 2022

Related U.S. Application Data

(63) Continuation of application No. PCT/CN2021/120616, filed on Sep. 26, 2021.

(30) Foreign Application Priority Data

May 27, 2021   (CN) .......................... 202110583905.6

(51) Int. Cl.
  *B25J 11/00*    (2006.01)
  *B25J 9/16*    (2006.01)
  (Continued)

(52) U.S. Cl.
  CPC .......... *B25J 11/0095* (2013.01); *B25J 9/1664* (2013.01); *B25J 13/088* (2013.01); *B25J 15/0014* (2013.01); *B25J 15/0616* (2013.01)

(58) Field of Classification Search
  CPC .... B25J 11/0095; B25J 9/1664; B25J 9/1692; B25J 13/088; B25J 15/0014;
  (Continued)

(56) References Cited

U.S. PATENT DOCUMENTS 6,363,808 B1 *  4/2002  Wakabayashi .... H01L 21/67796
                                                     310/112
8,951,002 B2 *  2/2015  Kremerman ............. B25J 9/042
                                                     414/744.1
(Continued)

FOREIGN PATENT DOCUMENTS

CN       101537617 A    9/2009
CN       102017121 B    1/2013
(Continued)

*Primary Examiner* — Stephen A Vu
(74) *Attorney, Agent, or Firm* — Kilpatrick Townsend & Stockton LLP (57) ABSTRACT

Embodiments relate to a device for correcting a robotic arm, including: a first robotic arm positioned in a vacuum transmission chamber; a first jig wafer comprising a first wafer body and a first jig positioned on a front surface of the first wafer body; a first distance measuring sensor positioned at a center position of a back surface of the first wafer body and configured to detect whether a center of the first jig wafer is aligned with a center of a wafer chuck; a second distance measuring sensor positioned on the front surface of the first wafer body and on an outside of the first jig and configured to detect a lifting height of the first robotic arm when the first robotic arm controls a pick-and-place operation the first jig wafer on an upper surface of the wafer chuck.

16 Claims, 6 Drawing Sheets

(51) Int. Cl.
*B25J 13/08* (2006.01)
*B25J 15/00* (2006.01)
*B25J 15/06* (2006.01)

(58) Field of Classification Search
CPC ....... B25J 15/0616; G05B 2219/37608; G05B 2219/45031; G05B 2219/39557
See application file for complete search history.

(56) References Cited

U.S. PATENT DOCUMENTS

| | | | |
|---|---|---|---|
| 9,751,209 B2 * | 9/2017 | Caveney | B25J 18/04 |
| 9,966,812 B2 * | 5/2018 | Zhang | H02K 5/124 |
| 2013/0294877 A1 * | 11/2013 | Hosek | B25J 15/0014 |
| | | | 414/800 |
| 2014/0137690 A1 * | 5/2014 | Hofmeister | B25J 9/042 |
| | | | 74/490.06 |
| 2017/0194183 A1 | 7/2017 | Xu | |

FOREIGN PATENT DOCUMENTS

| | | | | |
|---|---|---|---|---|
| CN | 102956436 A | | 3/2013 | |
| CN | 103646904 A | | 3/2014 | |
| CN | 205881886 U | | 1/2017 | |
| CN | 113305841 A | | 8/2021 | |
| JP | 2007080960 A | | 3/2007 | |
| KR | 100725933 B1 | | 6/2007 | |
| KR | 20110021941 A | * | 3/2011 | ....... H01L 21/67265 |

* cited by examiner

DEVICE FOR CORRECTING ROBOTIC ARM

CROSS-REFERENCE TO RELATED APPLICATION

This application is a continuation of PCT/CN2021/120616, filed on Sep. 26, 2021, which claims priority to Chinese Patent Application No. 2021105839056 titled "DEVICE FOR CORRECTING ROBOTIC ARM" and filed to the State Patent Intellectual Property Office on May 27, 2021, the entire contents of which are incorporated herein by reference.

TECHNICAL FIELD

The present disclosure relates to the field of wafer transmission in semiconductor processing technologies, and more particularly, to a device for correcting a robotic arm.

BACKGROUND

In the field of semiconductor technologies, wafers need to be transferred in different chambers to perform different processing procedures on the wafers, such as etching processes and deposition processes. Robotic arms are generally used as tools configured to transfer the wafers. Common robotic arms include vacuum transmission module robotic arms (VTM robotic arms) and air transmission module robotic arms (ATM robotic arms).

Before the wafers are transferred by the robotic arms, generally it is necessary to correct movement accuracy of the robotic arms to prevent the robotic arms from damaging the wafers during movement.

In a correction process of robotic arms by means of conventional robotic arm correction systems, generally operators correct positions of the robotic arms moving to different chambers or air lock chambers by means of external handles and correction jigs. It is required to open the chambers to place and take out the jigs, and thus a lot of retooling work is required after the correction is completed, which increases tool downtime.

SUMMARY

The present disclosure provides a device for correcting a robotic arm, including: a first robotic arm positioned in a vacuum transmission chamber; a first jig wafer comprising a first wafer body and a first jig, wherein the first jig is positioned on a front surface of the first wafer body; a first distance measuring sensor positioned at a center position of a back surface of the first wafer body, wherein the first distance measuring sensor is configured to detect whether a center of the first jig wafer is aligned with a center of a wafer chuck; a second distance measuring sensor positioned on the front surface of the first wafer body and on an outside of the first jig, wherein the second distance measuring sensor is configured to detect a lifting height of the first robotic arm when the first robotic arm controls a pick-and-place operation the first jig wafer on an upper surface of the wafer chuck; a first control device connected to the first distance measuring sensor and the second distance measuring sensor, wherein the first control device is configured to output a control signal when the center of the first jig wafer is deviated from the center of the wafer chuck; and a driving device connected to the first control device, wherein the driving device is configured to control the first jig to drive the first wafer body to move after the control signal is received.

DETAILED DESCRIPTION

For ease of understanding the present disclosure, the present disclosure will be described more fully hereinafter with reference to the accompanying drawings. Some embodiments of the present disclosure are provided in the accompanying drawings. The present disclosure may, however, be embodied in many different forms and should not be limited to the embodiments set forth herein. Rather, these embodiments are provided so that disclosed contents of the present disclosure are understood more thoroughly and completely.

Unless otherwise defined, all technical and scientific terms employed herein have the same meaning as commonly understood by one of ordinary skill in the art to which the present disclosure belongs. The terms employed in the specification of the present disclosure are merely for the purpose of describing some embodiments and are not intended for limiting the present disclosure. As used herein, the term "and/or" includes any and all combinations of one or more of the associated listed items.

When describing positional relationship, unless otherwise specified, when an element such as a layer, film or substrate is referred to as being "on" another film layer, it can be directly on the other film layer or intervening film layer may also be present. Further, when a layer is referred to as being "under" another layer, it can be directly under the other layer, or one or more intervening layers may also be present. It is also to be understood that when a layer is referred to as being "between" two layers, it can be the only one between the two layers, or one or more intervening layers may also be present.

In the case of "comprising", "having", and "including" as described herein, another component may be added unless a clearly defined term is used, such as "only", "consisting of", etc. Unless mentioned to the contrary, terms in the singular form may include the plural form and cannot be understood as one in number.

Figure 1:
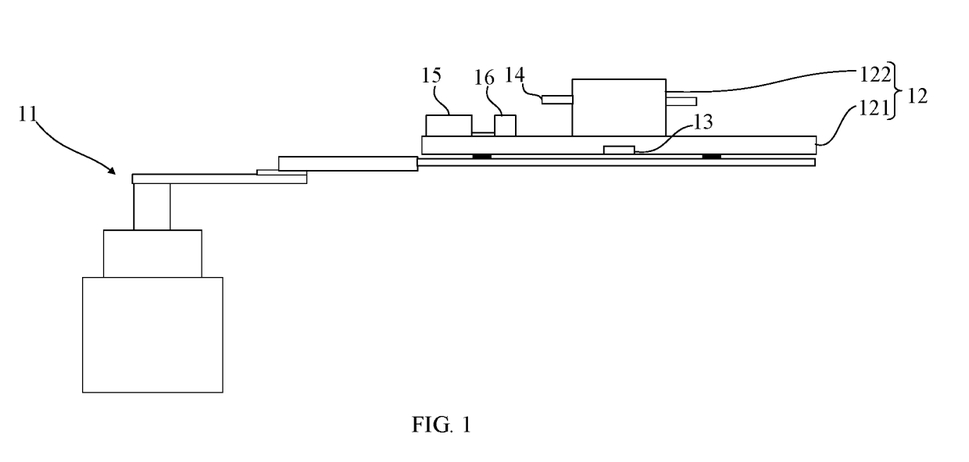
FIG. 1 is a schematic structural diagram of a device for correcting a robotic arm according to an embodiment.

One embodiment of the present disclosure discloses a device for correcting a robotic arm, as shown in FIG. 1, the device for correcting a robotic arm includes: a first robotic arm 11 positioned in a vacuum transmission chamber; a first jig wafer 12 comprising a first wafer body 121 and a first jig 122, wherein the first jig 122 is positioned on a front surface of the first wafer body 121; a first distance measuring sensor 13 positioned at a center position of a back surface of the first wafer body 121, wherein the first distance measuring sensor 13 is configured to detect whether a center of the first jig wafer 12 is aligned with a center of a wafer chuck 17; a second distance measuring sensor 14 positioned on the front surface of the first wafer body 121 and on an outside of the first jig 122, wherein the second distance measuring sensor 14 is configured to detect a lifting height of the first robotic arm 11 when the first robotic arm 11 controls a pick-and-place operation the first jig wafer 12 on an upper surface of the wafer chuck 17; a first control device 15 connected to the first distance measuring sensor 13 and the second distance measuring sensor 14, wherein the first control device 15 is configured to output a control signal when the center of the first jig wafer 12 is deviated from the center of the wafer chuck 17; and a driving device 16 connected to the first control device 15, wherein the driving device 16 is configured to control the first jig 122 to drive the first wafer body 121 to move after the control signal is received.

In some embodiments, as shown in FIG. 1, the first jig wafer 12 may be placed on the first robotic arm. The first jig wafer 12 includes the first wafer body 121 and the first jig 122. In some embodiments, the first jig 122 is arranged at a center position of the front surface of the first wafer body 121. The center of the back surface of the first wafer body 121 is provided with the first distance measuring sensor 13, which may be configured to detect whether the center of the first jig wafer 12 is aligned with the center of the wafer chuck 17. In some embodiments, the first distance measuring sensor 13 may be a laser transmitter receiver. When the center of the first jig wafer 12 is not aligned with the center of the wafer chuck 17, the first control device 15 transmits a control signal to the driving device 16, such that the driving device 16 is controlled to drive the first jig 122 to move to drive the first wafer body 121 to move. In this way, the center position of the first jig wafer 12 is adjusted.

Figure 2:
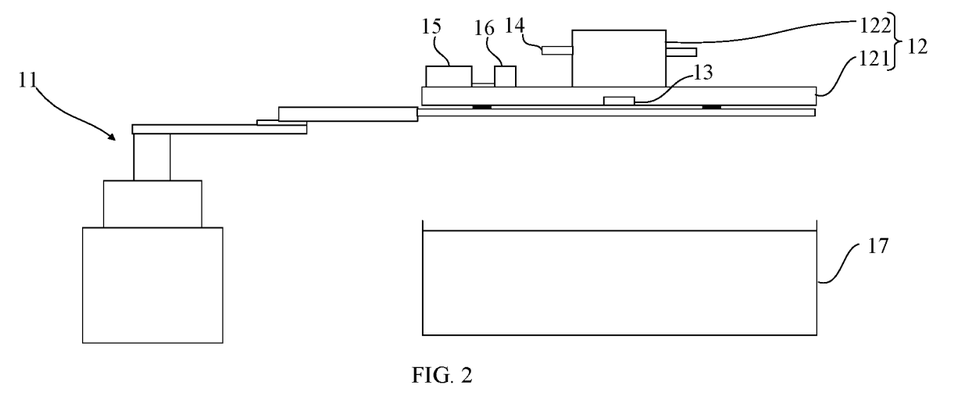
FIG. 2 is a schematic structural diagram of the robotic arm before a jig wafer is placed onto a wafer chuck according to an embodiment.

As an example, as shown in FIG. 2, when the first robotic arm 11 is controlled to place the first jig wafer 12 on the wafer chuck 17, a distance from an edge ring of the wafer chuck 17 to the first distance measuring sensor 13 is first measured by means of the first distance measuring sensor 13 to obtain a measurement result. In some embodiments, a plurality of points are selected from the edge ring, such that the first distance measuring sensor 13 measures a distance from each of the plurality of points to the first distance measuring sensor 13. When the distance from each of the plurality of points on the edge ring to the first distance measuring sensor 13 is equal, it may be determined that the center of the first jig wafer 12 has been aligned with the center of the wafer chuck 17, and thus it is not required to correct the position of the first robotic arm 11. When the distance from each of the plurality of points on the edge ring to the first distance measuring sensor 13 is different, it may be determined that the center of the first jig wafer 12 has not been aligned with the center of the wafer chuck 17, and thus it is required to adjust the position of the first jig wafer 12. The measurement result includes a deviation value between the center of the first jig wafer 12 and the center of the wafer chuck 17. The wafer chuck 17 may be an electrostatic chuck or a vacuum chuck.

With continued reference to FIG. 2, the first control device 15 is connected to the first distance measuring sensor 13 (the connection relationship is not shown in the figure), and the first control device 15 is also connected to the driving device 16. After receiving the measurement result from the first distance measuring sensor 13, the first control device 15 generates a control signal according to the measurement result and transmits the control signal to the driving device 16. The driving device 16 drives the first jig 122 to move according to the control signal. In its moving process, the first jig 122 drives the first wafer body 121 to move to adjust the position of the first jig wafer 12, such that the center of the first jig wafer 12 is aligned with the center of the wafer chuck 17. The control signal includes a movement direction and a movement distance of the first jig 122.

In some embodiments, in one embodiment, after receiving the measurement result, the first control device 15 evaluates the deviation value between the center of the first jig wafer 12 and the center of the wafer chuck 17, and compares the deviation value with a preset deviation value. When the deviation value is less than or equal to the preset deviation value, the first control device 15 transmits the control signal to the driving device 16 to drive the first jig 122 to drive the first wafer body 121 to move, such that the position of the first jig wafer 12 is adjusted until the center of the first jig wafer 12 is aligned with the center of the wafer chuck 17. When the deviation value is greater than the preset deviation value, the first control device 15 forwards the measurement result to a tool control system, such that the tool control system controls and adjusts the robotic arm to move in a horizontal direction until the center of the first jig wafer 12 gets close to the center of the wafer chuck 17. Next, the measurement result is obtained again, and when the deviation value between the center of the first jig wafer 12 and the center of the wafer chuck 17 is less than the preset deviation value, the first control device 15, the driving device 16 and the first jig 122 adjust the position of the first jig wafer 12.

In this embodiment, the front surface of the first wafer body 121 is also provided with a second distance measuring sensor 14, which is positioned on an outer layer of the first jig 122. In some embodiments, the second distance measuring sensor 14 may also be a laser transmitter receiver. The second distance measuring sensor 14 may be configured to detect a lifting height of the first robotic arm 11 when the first robotic arm 11 controls a pick-and-place operation the first jig wafer 12 on an upper surface of the wafer chuck 17. As an example, when the first robotic arm 11 picks up or places the first jig wafer 12 on the upper surface of the wafer chuck 17, the second distance measuring sensor 14 may measure a distance between a top of the chamber and the second distance measuring sensor 14. Based on measurement of variation of this distance, the lifting height or a descending height of the first robotic arm 11 when the first robotic arm 11 picks up or places the first jig wafer 12 may be obtained as first height information. In this way, height monitoring of the first robotic arm 11 is implemented. The tool control system may adjust the height of the first robotic arm 11 according to the first height information.

In some embodiments, when the first robotic arm 11 is controlled to pick up or place the first jig wafer 12, the first distance measuring sensor 13 may also measure the distance between the center of the wafer chuck 17 and the center of the back surface of the first jig wafer 12 to obtain a height variation value (i.e., second height information) of the first robotic arm 11. The second height information may be configured for verifying the first height information, such that when the second distance measuring sensor 14 breaks down, a problem can be discovered in time, and thereby a wafer can be prevented from being damaged during movement due to the breakdown of the distance measuring sensor.

By means of the distance measuring sensor, the control device, the driving device 16 and the jig, the above-mentioned device for correcting a robotic arm can implement the position correction of the robotic arm in the vacuum transmission chamber. Compared with manual calibration, it is higher in calibration accuracy, it is unnecessary to open the chamber, and it is not required to retool, such that tool downtime can be effectively reduced, and efficiency can be improved.

Figure 3A:
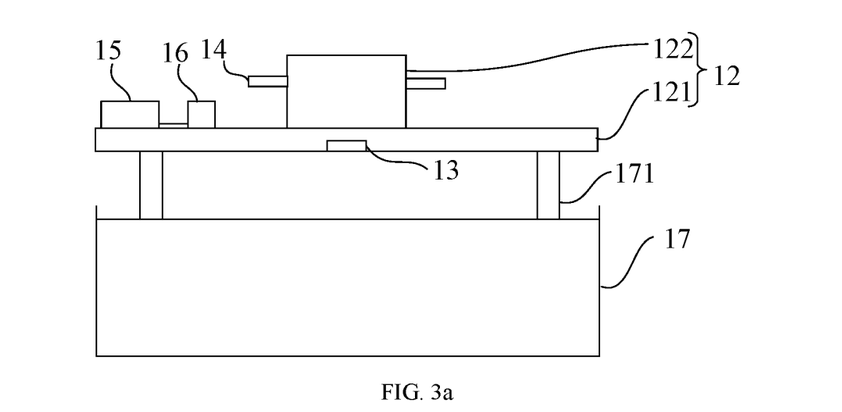
FIG. 3a and FIG. 3b are schematic structural diagrams after the jig wafer is placed on the wafer chuck and after a thimble pin of the wafer chuck rises and descends according to an embodiment.
Figure 3B:
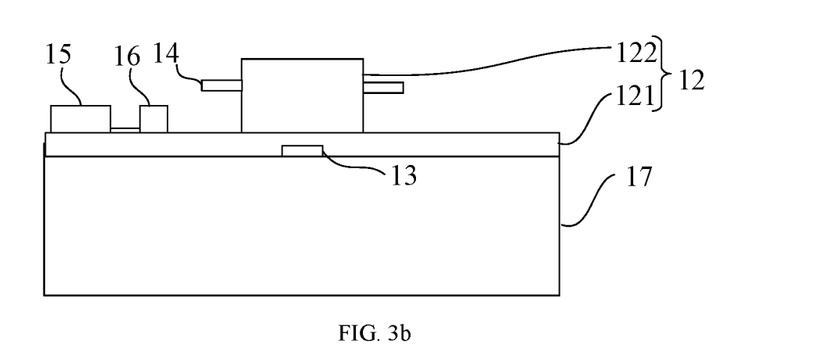
Figure 6:
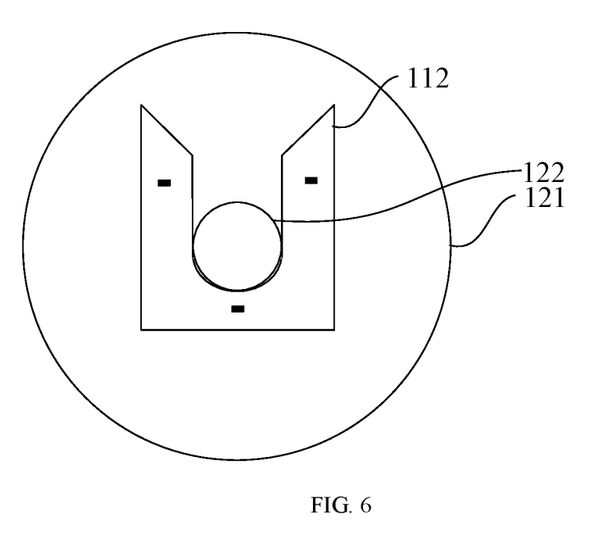
FIG. 6 is a schematic structural diagram when the pair of interdigitated fingers of the first robotic arm are positioned on two sides of the first jig according to an embodiment.

In one embodiment, as shown in FIG. 3a and FIG. 3b, the wafer chuck 17 is positioned in the vacuum transmission chamber, and a plurality of thimble pins 171 are also provided at the wafer chuck 17. When the first jig wafer 12 is transferred above the wafer chuck 17, a given one of the plurality of thimble pins 171 rises to support the first jig wafer 12. After the given thimble pin 171 descends to return to its home position, the first jig wafer 12 is placed on the upper surface of the wafer chuck 17, and at this moment the first jig wafer 12 is sucked on the wafer chuck 17. When the first jig wafer 12 is placed on the upper surface of the wafer chuck 17, a lower surface of the second distance measuring sensor 14 may be flush with a top of the given thimble pin 171 when it rises. Thus, after the position of the first robotic arm 11 is adjusted based on the position of the first jig 122 as shown in FIG. 6, and after the given thimble pin 171 rises, the first robotic arm 11 may be exactly positioned below the first jig wafer 12 when it goes deep into the vacuum transmission chamber again based on the adjusted height and position.

Figure 4:
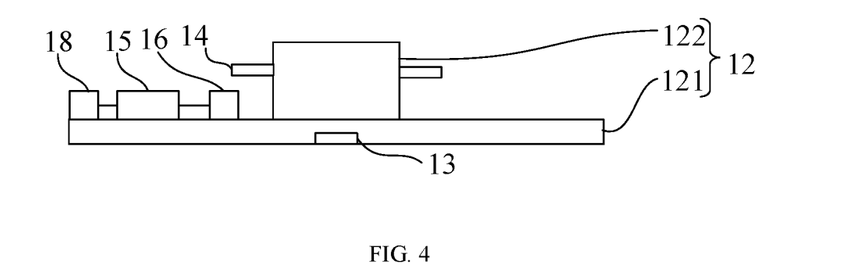
FIG. 4 is a schematic structural diagram of a first jig wafer according to an embodiment.

In one embodiment, as shown in FIG. 4, the device for correcting a robotic arm also includes a first transmission module 18 connected to the first control device 15, wherein the first transmission module 18 is configured to transmit a detection result of the first distance measuring sensor 13 and a detection result of the second distance measuring sensor 14 to the tool control system.

As an example, the first transmission module 18 may be a wireless transmission module, such as a WIFI module. By means of the first transmission module 18, real-time measurement data of the correction device can be transmitted to the tool control system for display, analysis and processing.

In one embodiment, the first transmission module 18 is also configured to transmit the detection result of the first distance measuring sensor 13 and the detection result of the second distance measuring sensor 14 to the tool control system for storage. The tool control system may calibrate other robotic arms by means of the stored detection results, including parameters such as the height and horizontal position of the robotic arm during wafer transfer.

In one example, there are a plurality of second distance measuring sensors 14, and the plurality of second distance measuring sensors 14 are respectively positioned outside the first jig 122 at intervals. The first control device 15 is also configured to determine whether the first robotic arm 11 is in a horizontal state according to the detection results of the plurality of second distance measuring sensors 14.

In some embodiments, the plurality of second distance measuring sensors 14 respectively measure straight-line distances between themselves and the first robotic arm 11. When the measurement results of the plurality of second distance measuring sensors 14 are equal, this means that the first robotic arm 11 is in the horizontal state. However, when the measurement results of the plurality of second distance measuring sensors 14 are not equal, this means that the first robotic arm 11 is not in the horizontal state.

Figure 5A:
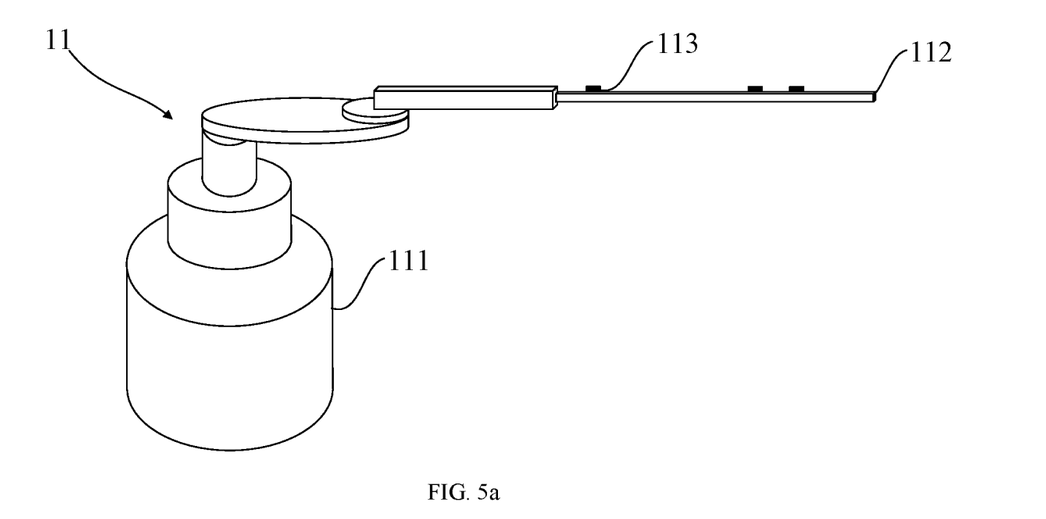
FIG. 5a is a schematic structural diagram of a first robotic arm according to an embodiment.
Figure 5B:
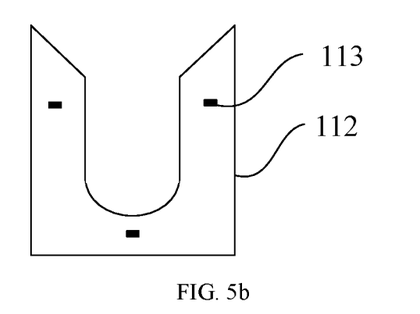
FIG. 5b is a schematic structural diagram of a pair of interdigitated fingers of the first robotic arm according to an embodiment.

In one embodiment, as shown in FIG. 5a and FIG. 5b, the first robotic arm 11 includes an interdigitated robotic arm, and the interdigitated robotic arm includes a robotic arm body and a pair of interdigitated fingers, wherein the pair of interdigitated fingers are fixed at an end of the robotic arm body and are arranged in parallel at intervals. A width of the first jig 122 is less than or equal to a spacing between the pair of interdigitated fingers of the first robotic arm 11. In this embodiment, the robotic arm body is a first robotic arm body 111, and the pair of interdigitated fingers are first interdigitated fingers 112.

In some embodiments, the tool control system can flexibly adjust a height, direction, and movement speed of the first robotic arm body 111. The first interdigitated fingers 112 are fixedly installed on the first robotic arm body 111 and can move with the first robotic arm body 111. The first interdigitated fingers 112 are mainly configured to carry and moving a wafer. To prevent the wafer from slipping off in the process of moving the wafer, a vacuum suction unit 113 may be arranged on surface of the first interdigitated fingers 112. The vacuum suction unit 113 may protrude from the surface of the first interdigitated fingers 112, or may be arranged inside the first interdigitated fingers 112. That is, the upper surface of the vacuum suction unit 113 is flush with the surface of the first interdigitated fingers 112.

A width of the first jig 122 is less than or equal to a spacing between the first interdigitated fingers 112. Therefore, when the first robotic arm 11 is controlled to pick up or place the first jig wafer 12, the position of the first robotic arm 11 may be first adjusted based on the position of the first jig 122, such that the first robotic arm 11 can clamp the first jig 122 between the first interdigitated fingers 112, as shown in FIG. 6. The position of the first robotic arm 11 is adjusted first by this means In this way, such that it may be ensured that when the first robotic arm 11 stretches into the vacuum transmission chamber again to lift up the wafer, the first interdigitated fingers 112 are positioned in the middle of the wafer, and thus can steadily lift up the wafer.

Figure 7:
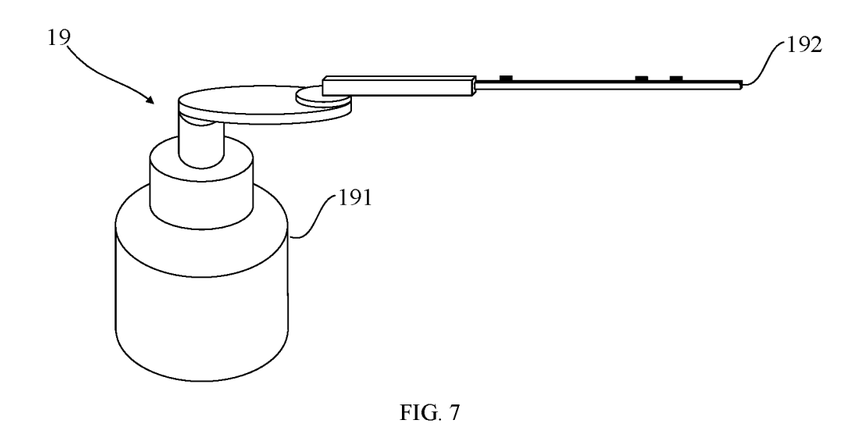
FIG. 7 is a schematic structural diagram of a second robotic arm according to an embodiment.
Figure 8:
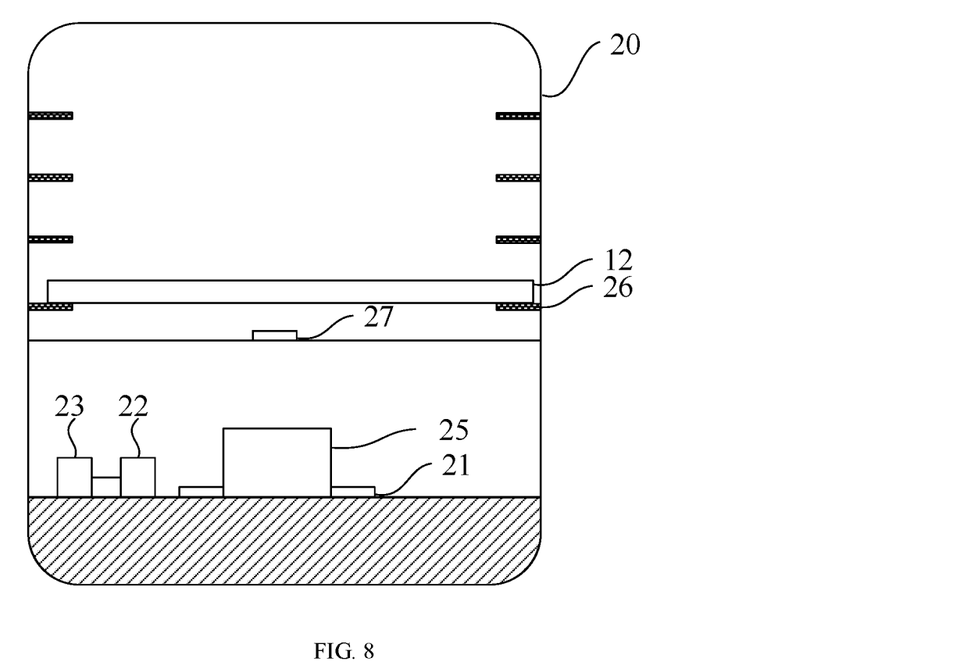
FIG. 8 is a schematic structural diagram of a jig wafer cassette according to an embodiment.

In one embodiment, as shown in FIG. 7 and FIG. 8, the device for correcting a robotic arm also includes: a second robotic arm 19 positioned in an atmospheric transmission chamber, wherein the second robotic arm 19 comprises at least one interdigitated robotic arm of the first robotic arms 11; a jig wafer cassette 20 configured to place the first jig wafer 12; a plurality of third distance measuring sensors 21 arranged at intervals along a circumferential direction of an inner wall of the jig wafer cassette 20 and positioned under the first jig wafer 12, wherein the plurality of third distance measuring sensors 21 are configured to detect a distance between the plurality of third distance measuring sensors 21 and the second robotic arm 19; a second control device 22 connected to each of the plurality of third distance measuring sensors 21, wherein the second control device 22 is configured to determine whether the second robotic arm 19 is in a horizontal state according to a detection result of each of the plurality of third distance measuring sensors 21; and a second transmission module 23 connected to the second control device 22, wherein the second transmission module 23 is configured to transmit a determination result of the second control device 22 to the tool control system.

The tool not only includes a vacuum transmission chamber, but also includes an atmospheric transmission chamber. The second robotic arm 19 in this embodiment is positioned in the atmospheric transmission chamber. As an example, as shown in FIG. 7, the second robotic arm 19 includes at least one interdigitated robotic arm that is the same as the first robotic arm 11, wherein the interdigitated robotic arm includes a second robotic arm body 191 and second interdigitated fingers 192.

The jig wafer cassette 20 may be configured to place the first jig wafer 12 or to place a plurality of wafers at the same time. As an example, as shown in FIG. 8, a plurality of wafer carrying units 26 may be provided in the jig wafer cassette 20, and the plurality of wafer carrying units 26 may be wafer clamping slots extending along the circumferential direction of the jig wafer cassette 20 or wafer supporting blocks arranged at intervals along the circumferential direction of the jig wafer cassette 20. The first jig wafer 12 is positioned on the plurality of wafer carrying units 26. A plurality of third distance measuring sensors 21 are provided in the jig wafer cassette 20, wherein the plurality of third distance measuring sensors 21 are arranged inside the jig wafer at intervals along the circumferential direction of the jig wafer cassette 20.

As an example, as shown in FIG. 8, the plurality of third distance measuring sensors 21 are arranged at intervals on a periphery of the second jig 25, wherein the second jig 25 and the plurality of third distance measuring sensors 21 are both positioned below the first jig wafer 12. The plurality of third distance measuring sensors 21 may be configured to detect a distance between the second robotic arm 19 and each of the plurality of third distance measuring sensors 21, and transmit detection results to the second control device 22 to determine whether the second robotic arm 19 is a horizontal state. The second transmission module 23 is connected to the second control device 22, and may be configured to transmit a determination result of the second control device 22 to the tool control system. In addition, the second transmission module 23 may also transmit data actually measured by each of the plurality of third distance measuring sensors 21 to the tool control system, such that the tool control system can adjust a state of the second robotic arm 19 to the horizontal state based on the detected data.

Similar to the first jig 122, the second jig 25 also has the function of correcting the position of the robotic arm. Before the second robotic arm 19 extends into the jig wafer cassette 20 to pick up or place the jig wafer, the second interdigitated fingers 192 first clamp on two sides of the second jig 25 to ensure that the second robotic arm 19 is positioned in the middle of the wafer when the wafer is lifted, thereby preventing the wafer from slipping off. When the second interdigitated fingers 192 of the second robotic arm 19 clamp on the two sides of the second jig 25, the third distance measuring sensor 21 and the second control device 22 can complete the detection and determination of the horizontal state of the second robotic arm 19.

In one embodiment, the first jig wafer 12 may be configured to perform correction from the first robotic arm 11 to an air lock chamber, a buffer chamber, a cooling chamber, and a process chamber. Furthermore, the first jig wafer 12 may also be configured to perform correction from the second robotic arm 19 to the air lock chamber, the buffer chamber, the cooling chamber, and the process chamber.

In one embodiment, with continued reference to FIG. 8, the device for correcting a robotic arm also includes a fourth distance measuring sensor 27 configured to detect a lifting height of the second robotic arm 19 when the second robotic arm 19 transfers the wafer. The fourth distance measuring sensor 27 is connected to the second transmission module 23, and the second transmission module 23 is also configured to transmit a detection result of the fourth distance measuring sensor 27 to the tool control system. The fourth distance measuring sensor 27 is arranged in the jig wafer cassette 20 and is positioned under the first jig wafer 12. When the second robotic arm 19 lifts the first jig wafer 12, the fourth distance measuring sensor 27 can measure a height variation of the first jig wafer 12, wherein the height variation is the lifting height of the second robotic arm 19. Because a spacing between adjacent wafer carrying units 26 is a fixed value, the lifting height of the second robotic arm 19 cannot be too large. According to the spacing between the adjacent wafer carrying units 26, the tool control system may be controlled to adjust the lifting height of the second robotic arm 19 to prevent the wafer from being damaged by hitting other wafer carrying units 26.

Figure 9:
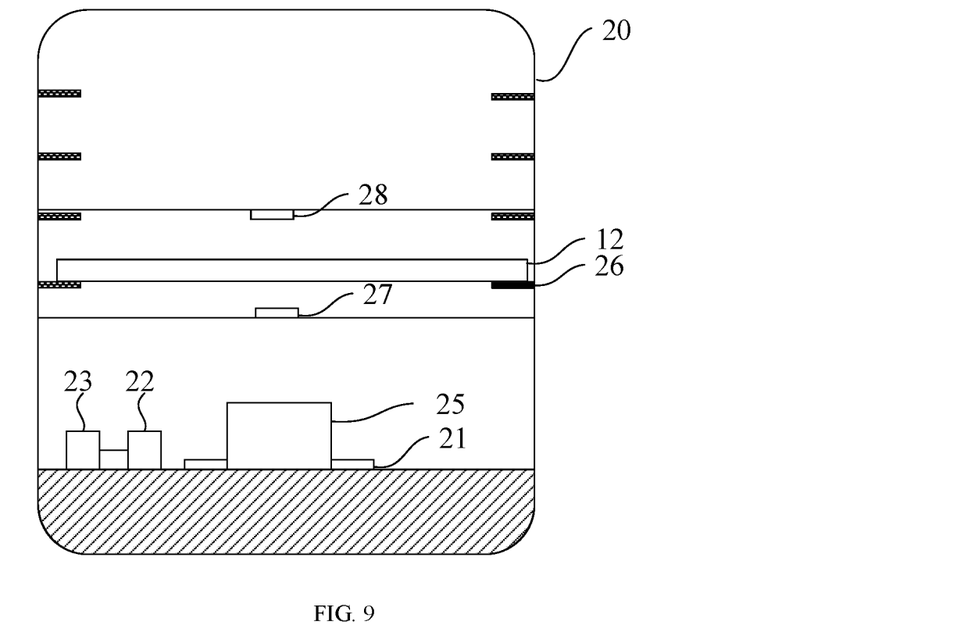
FIG. 9 is a schematic structural diagram of another jig wafer cassette according to an embodiment.

As an example, as shown in FIG. 9, a fifth distance measuring sensor 28 may be provided in the jig wafer cassette 20, and the fifth distance measuring sensor 28 is positioned above the first jig wafer 12. The fifth distance measuring sensor 28 can independently measure the lifting height of the second robotic arm 19 when the fourth distance measuring sensor 27 is working, and also can transmit the height variation data to the second control device 22, such that the second control device 22 may verify the data measured by the fourth distance measuring sensor 27 to improve reliability of the correction device.

In one embodiment, the second transmission module 23 is also configured to transmit the detection result of the third distance measuring sensor 21 and the detection result of the fourth distance measuring sensor 27 to the tool control system for storage. By storing the detection results, the data collected during the correction process may be configured for verifying other robotic arms.

Figure 10A:
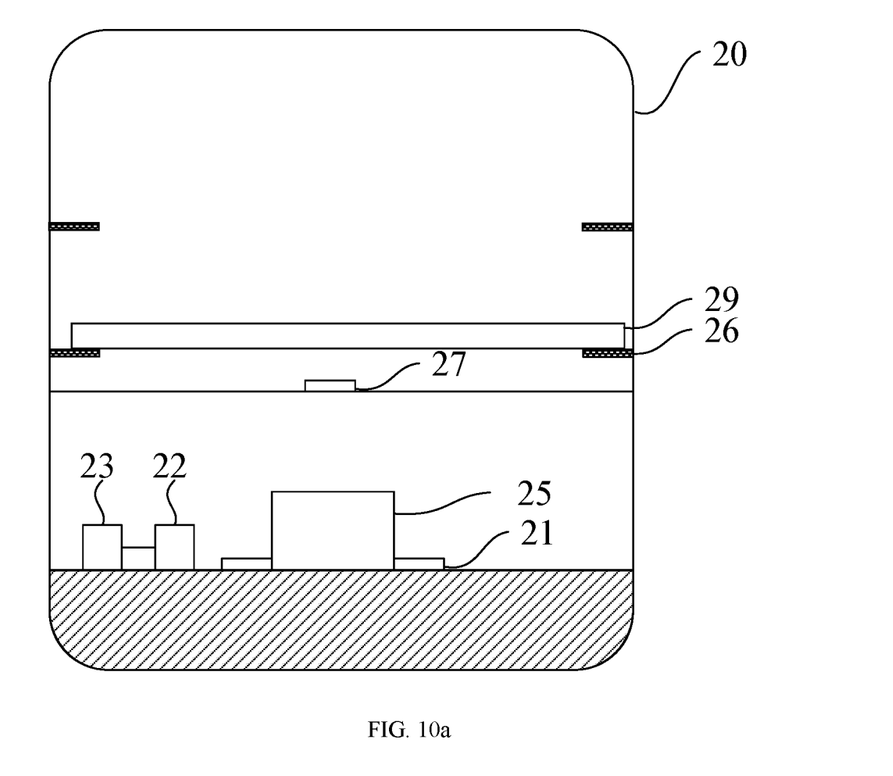
FIG. 10a is a schematic structural diagram when a second jig wafer is placed in the jig wafer cassette according to an embodiment.
Figure 10B:
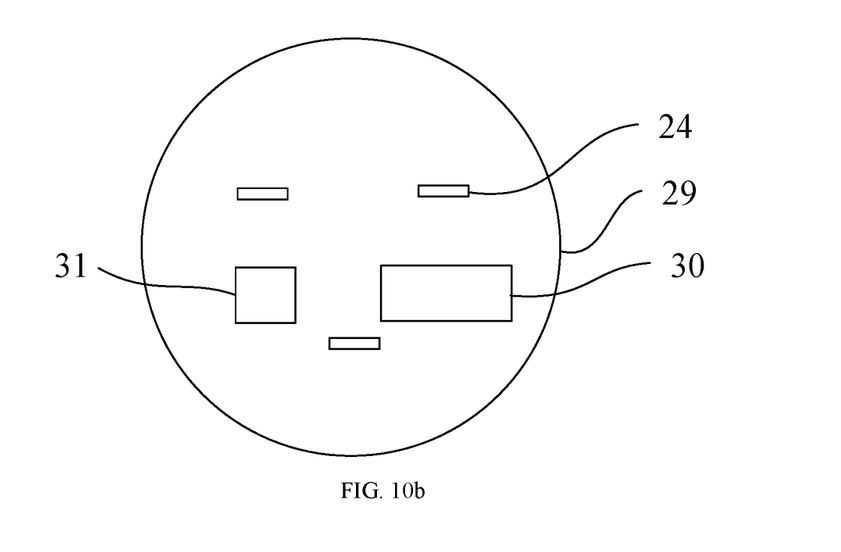
FIG. 10b is a schematic structural diagram of the second jig wafer according to an embodiment.

In one embodiment, the second robotic arm 19 is provided with a plurality of vacuum suction units 113 arranged at intervals. The plurality of vacuum suction units 113 may protrude from the surface of the first interdigitated fingers 112, or the plurality of vacuum suction units 113 may be arranged inside the first interdigitated fingers 112. That is, the upper surface of the plurality of vacuum suction units 113 is flush with the surface of the first interdigitated fingers 112. As shown in FIG. 10a and FIG. 10b, the device for correcting a robotic arm also includes a second jig wafer 29, a third control device 30, and a third transmission module 31. The second jig wafer 29 is positioned in the jig wafer cassette 20, a plurality of pressure sensors 24 are provided on the back surface of the second jig wafer 29, the plurality of pressure sensors 24 are arranged in correspondence to the plurality of vacuum suction units 113 of the second robotic arm 19, and the plurality of pressure sensors 24 are configured to detect suction forces of the plurality of vacuum suction units 113. The third control device 30 is connected to each of the plurality of pressure sensors 24, and is configured to determine, according to the detection results of the plurality of pressure sensors 24, whether the suction forces of the plurality of vacuum suction units 113 are equal. The third transmission module 31 is connected to the third control device 30, and is configured to transmit a determination result of the third control device 30 to the tool control system.

Figure 11A:
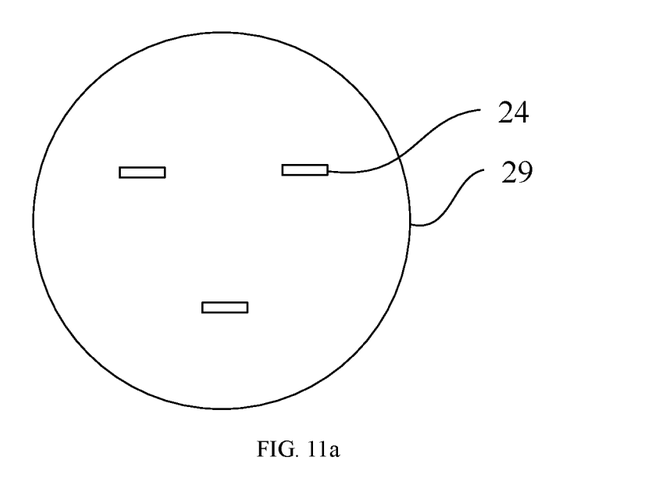
FIG. 11a is a location layout diagram of a pressure sensor arranged on a back surface of the second jig wafer according to an embodiment.
Figure 11B:
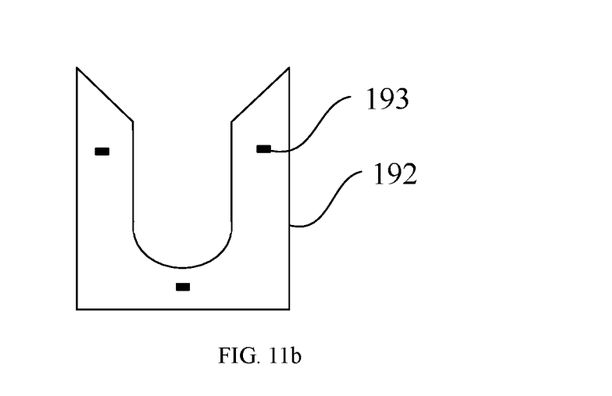
FIG. 11b is a location layout diagram of a vacuum suction unit arranged on the second robotic arm according to an embodiment.

In some embodiments, as shown in FIG. 11*a* and FIG. 11*b*, a plurality of pressure sensors 24 are provided on the back surface of the second jig wafer 29, and a plurality of vacuum suction units 113 arranged at intervals are provided on the second robotic arm 19. Positions of the plurality of pressure sensors and positions of the plurality of vacuum suction units 113 correspond to each other, to ensure that the plurality of pressure sensors 24 can measure the suction forces of the plurality of vacuum suction units 113 on the second robotic arm 19. The plurality of vacuum suction units 113 can suck the wafer, which can ensure that the wafer will not slip off when the wafer is transferred by the robotic arm. By arranging the plurality of pressure sensors 24 on the back surface of the second jig wafer 29, the suction forces of the plurality of vacuum suction units 113 on the robotic arm can be measured in real time. The third control device 30 can determine, according to the suction forces measured by the plurality of pressure sensors 24, whether the suction forces of the plurality of vacuum suction units 113 on the robotic arm are equal, and whether the suction forces reach a minimum value. The third transmission module 31 can transmit the determination result of the third control device 30 to the tool control system, such that the tool control system adjusts the suction forces of the plurality of vacuum suction units 113. In some embodiments, the third transmission module 31 may also transmit the suction forces measured by the plurality of pressure sensors 24 to the tool control system, such that the tool control system can adjust the suction forces more accurately.

In one embodiment, the third transmission module 31 is also configured to transmit the detection results of the plurality of pressure sensors 24 to the tool control system for storage.

In one embodiment, in the jig wafer cassette 20, the second jig wafer 29 is placed below the first jig wafer 12, and the fourth distance measuring sensor 27 is positioned at least below the second jig wafer 29 or at least between the second jig wafer 29 and the first jig wafer 12. In another embodiment, there are a plurality of fourth distance measuring sensors 27, and the plurality of fourth distance measuring sensors 27 are respectively positioned below the second jig wafer 29 and between the second jig wafer 29 and the first jig wafer 12.

In some embodiments, the positions and the number of the plurality of fourth distance measuring sensors 27 may be adjusted according to actual needs, to achieve accurate measurement of the lifting height of the robotic arm without affecting wafer pick-and-place operation of the robotic arm, thereby preventing the wafer from being damaged due to too large lifting height.

In one embodiments, the first transmission module 18, the second transmission module 23 and the third transmission module 31 each include a wireless transmission module such as a WIFI module.

Technical features of the above embodiments may be arbitrarily combined. For simplicity, all possible combinations of the technical features in the above embodiments are not described. However, as long as the combination of these technical features is not contradictory, it shall be deemed to be within the scope recorded in this specification.

The above embodiments merely express a plurality of implementations of the present disclosure, and descriptions thereof are relatively concrete and detailed. However, these embodiments are not thus construed as limiting the patent scope of the present disclosure. It is to be pointed out that for persons of ordinary skill in the art, some modifications and improvements may be made under the premise of not departing from a conception of the present disclosure, which shall be regarded as falling within the scope of protection of the present disclosure. Thus, the scope of protection of the present disclosure shall be subject to the appended claims.

What is claimed is:

1. A device for correcting a robotic arm, comprising:
   a first robotic arm positioned in a vacuum transmission chamber;
   a first jig wafer comprising a first wafer body and a first jig, wherein the first jig is positioned on a front surface of the first wafer body;
   a first distance measuring sensor positioned at a center position of a back surface of the first wafer body, wherein the first distance measuring sensor is configured to detect whether a center of the first jig wafer is aligned with a center of a wafer chuck;
   a second distance measuring sensor positioned on the front surface of the first wafer body and on an outside of the first jig, wherein the second distance measuring sensor is configured to detect a lifting height of the first robotic arm when the first robotic arm controls a pick-and-place operation the first jig wafer on an upper surface of the wafer chuck;
   a first control device connected to the first distance measuring sensor and the second distance measuring sensor, wherein the first control device is configured to output a control signal when the center of the first jig wafer is deviated from the center of the wafer chuck; and
   a driving device connected to the first control device, wherein the driving device is configured to control the first jig to drive the first wafer body to move after the control signal is received;
   wherein the wafer chuck comprises an electrostatic chuck or a vacuum chuck.

2. The device for correcting a robotic arm according to claim 1, wherein the wafer chuck is positioned in the vacuum transmission chamber, a plurality of thimble pins being further provided at the wafer chuck, when the first jig wafer is transferred to above the wafer chuck, a given one of the plurality of thimble pins rises to support the first jig wafer, and after a given thimble pin descends to return to a home position, the first jig wafer is placed on an upper surface of the wafer chuck; and
   when the first jig wafer is placed on the upper surface of the wafer chuck, an upper surface of the second distance measuring sensor is flush with a top of the given thimble pin when the given thimble pin rises.

3. The device for correcting a robotic arm according to claim 1, further comprising:
   a first transmission module connected to the first control device, wherein the first transmission module is configured to transmit a detection result of the first distance measuring sensor and a detection result of the second distance measuring sensor to a tool control system.

4. The device for correcting a robotic arm according to claim 3, wherein the first transmission module is further configured to transmit the detection result of the first distance measuring sensor and the detection result of the second distance measuring sensor to the tool control system for storage.

5. The device for correcting a robotic arm according to claim 1, wherein there are provided a plurality of second distance measuring sensors, the plurality of second distance measuring sensors being respectively positioned at an outside of the first jig at intervals; and
  the first control device is further configured to determine whether the first robotic arm is in a horizontal state according to detection results of the plurality of second distance measuring sensors.

6. The device for correcting a robotic arm according to claim 1, wherein the first robotic arm comprises an interdigitated robotic arm, the interdigitated robotic arm comprising a robotic arm body and a pair of interdigitated fingers, the pair of interdigitated fingers being fixed at an end of the robotic arm body and being arranged in parallel at intervals; and
  a width of the first jig is less than or equal to a spacing between the pair of interdigitated fingers of the first robotic arm.

7. The device for correcting a robotic arm according to claim 6, further comprising:
  a second robotic arm positioned in an atmospheric transmission chamber, wherein the second robotic arm comprises at least one of the interdigitated robotic arms of the first robotic arm;
  a jig wafer cassette configured to place the first jig wafer;
  a plurality of third distance measuring sensors arranged in the jig wafer cassette at intervals along a circumferential direction of the jig wafer cassette and positioned under the first jig wafer, wherein the plurality of third distance measuring sensors are configured to detect a distance between the plurality of third distance measuring sensors and the second robotic arm;
  a second control device connected to each of the plurality of third distance measuring sensors, wherein the second control device is configured to determine whether the second robotic arm is in a horizontal state according to a detection result of each of the plurality of third distance measuring sensors; and
  a second transmission module connected to the second control device, wherein the second transmission module is configured to transmit a determination result of the second control device to a tool control system.

8. The device for correcting a robotic arm according to claim 7, wherein the first jig wafer is further configured to correct the first robotic arm to an air lock chamber, a buffer chamber, a cooling chamber, and a process chamber; and
  the first jig wafer is further configured to correct the second robotic arm to the air lock chamber, the buffer chamber, the cooling chamber, and the process chamber.

9. The device for correcting a robotic arm according to claim 7, wherein a wafer carrying unit is provided in the jig wafer cassette, the wafer carrying unit comprising a wafer clamping slot extending along the circumferential direction of the jig wafer cassette or wafer supporting blocks arranged at intervals along the circumferential direction of the jig wafer cassette, the first jig wafer being positioned on the wafer carrying unit;
  the device for correcting a robotic arm further comprises a fourth distance measuring sensor configured to detect a lifting height of the second robotic arm when the second robotic arm transfers a wafer; and
  the fourth distance measuring sensor is connected to the second transmission module, the second transmission module being further configured to transmit a detection result of the fourth distance measuring sensor to the tool control system.

10. The device for correcting a robotic arm according to claim 9, wherein the second transmission module is further configured to transmit the detection result of one of the plurality of third distance measuring sensors and the detection result of the fourth distance measuring sensor to the tool control system for storage.

11. The device for correcting a robotic arm according to claim 7, wherein the second robotic arm is provided with a plurality of vacuum suction units arranged at intervals;
  the device for correcting a robotic arm further comprises:
  a second jig wafer positioned in the jig wafer cassette, a plurality of pressure sensors being provided on a back surface of the second jig wafer, the plurality of pressure sensors corresponding to the plurality of vacuum suction unit of the second robotic arm and being configured to detect suction forces of the plurality of vacuum suction units;
  a third control device connected to each of the plurality of pressure sensors, wherein the third control device is configured to determine whether the suction forces of the plurality of vacuum suction units are equal according to a detection result of each of the plurality of pressure sensors; and
  a third transmission module connected to the third control device, wherein the third transmission module is configured to transmit a determination result of the third control device to the tool control system.

12. The device for correcting a robotic arm according to claim 11, wherein the third transmission module is further configured to transmit the detection result of each of the plurality of pressure sensors to the tool control system for storage.

13. The device for correcting a robotic arm according to claim 11, wherein the second jig wafer is positioned below the first jig wafer, a fourth distance measuring sensor being at least positioned below the second jig wafer or being at least positioned between the second jig wafer and the first jig wafer.

14. The device for correcting a robotic arm according to claim 13, wherein there are a plurality of fourth distance measuring sensors, the plurality of fourth distance measuring sensors being respectively positioned below the second jig wafer and positioned between the second jig wafer and the first jig wafer.

15. The device for correcting a robotic arm according to claim 11, wherein the first transmission module, the second transmission module and the third transmission module all comprise a wireless transmission module.

16. The device for correcting a robotic arm according to claim 1, wherein the first distance measuring sensor comprises a laser transmitter receiver.

* * * * *